United States Patent [19]

Kato et al.

[11] Patent Number: 5,136,396
[45] Date of Patent: Aug. 4, 1992

[54] IMAGE ENCODING METHOD

[75] Inventors: Shigeo Kato, Saitama; Yasuhiko Yasuda, Musashino; Hidefumi Ohsawa, Kawaguchi, all of Japan

[73] Assignee: Canon Kabushiki Kaisha, Tokyo, Japan

[21] Appl. No.: 764,059

[22] Filed: Sep. 24, 1991

Related U.S. Application Data

[63] Continuation of Ser. No. 400,103, Aug. 29, 1989.

[30] Foreign Application Priority Data

Aug. 30, 1988 [JP] Japan ................................ 63-217217
Aug. 30, 1988 [JP] Japan ................................ 63-217218

[51] Int. Cl.$^5$ .............................................. H04N 1/41
[52] U.S. Cl. ................................ 358/426; 358/261.2; 358/428; 358/430
[58] Field of Search ................ 358/426, 261.2, 428, 358/430, 443

[56] References Cited

U.S. PATENT DOCUMENTS

| | | |
|---|---|---|
| 3,813,485 | 5/1974 | Arps ................................ 358/261.2 |
| 4,363,036 | 12/1982 | Subramaniam ..................... 358/261.2 |
| 4,724,483 | 2/1988 | Shinada .............................. 358/135 |
| 4,811,112 | 3/1989 | Rutledge ........................... 358/261.2 |
| 4,876,610 | 10/1989 | Ohsawa et al. ....................... 358/443 |
| 4,878,125 | 10/1989 | Katayama et al. .................... 358/443 |

OTHER PUBLICATIONS

H. Kobayashi et al., Image Data Compression by Predictive Coding, Mar. 1974.
G. G. Langdon, Jr., Compression of Black-White Images With Arithmetic Coding, Jun. 1981.

*Primary Examiner*—Edward L. Coles, Sr.
*Assistant Examiner*—Thomas D. Lee
*Attorney, Agent, or Firm*—Fitzpatrick, Cella, Harper & Scinto

[57] ABSTRACT

In an image encoding method in which a pixel of interest is predicted with reference to a plurality of pixels near the pixel of interest to be encoded, and encoding is performed on the basis of coincidence/noncoincidence between the predicted pixel and the pixel of interest, a parameter for predicting a pixel is changed on the basis of a rate of coincidence/noncoincidence of the predicted pixel and the pixel of interest.

19 Claims, 12 Drawing Sheets

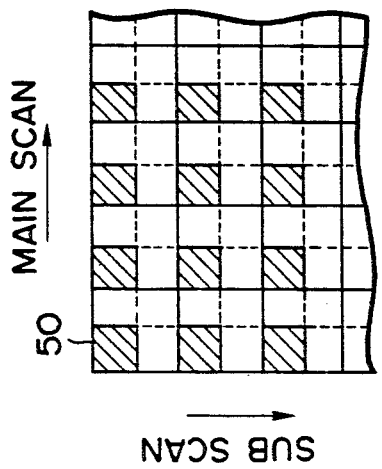
FIG.3
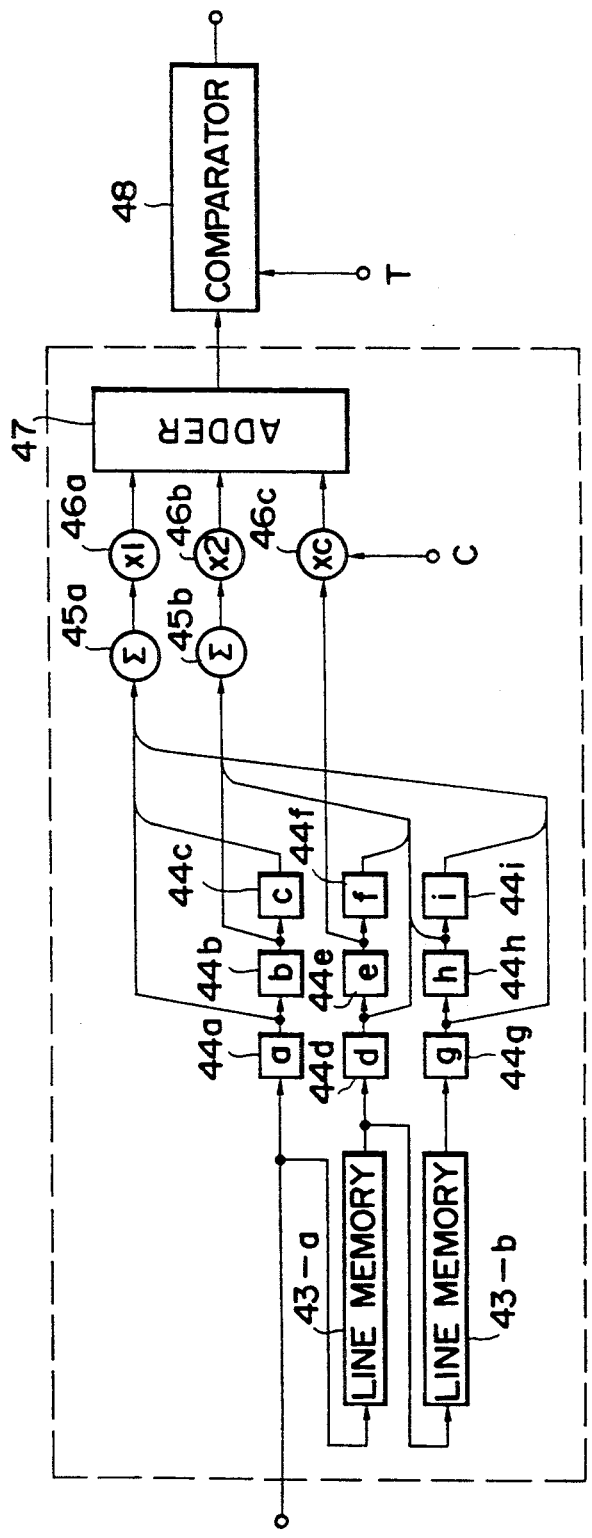
FIG.5
FIG.4

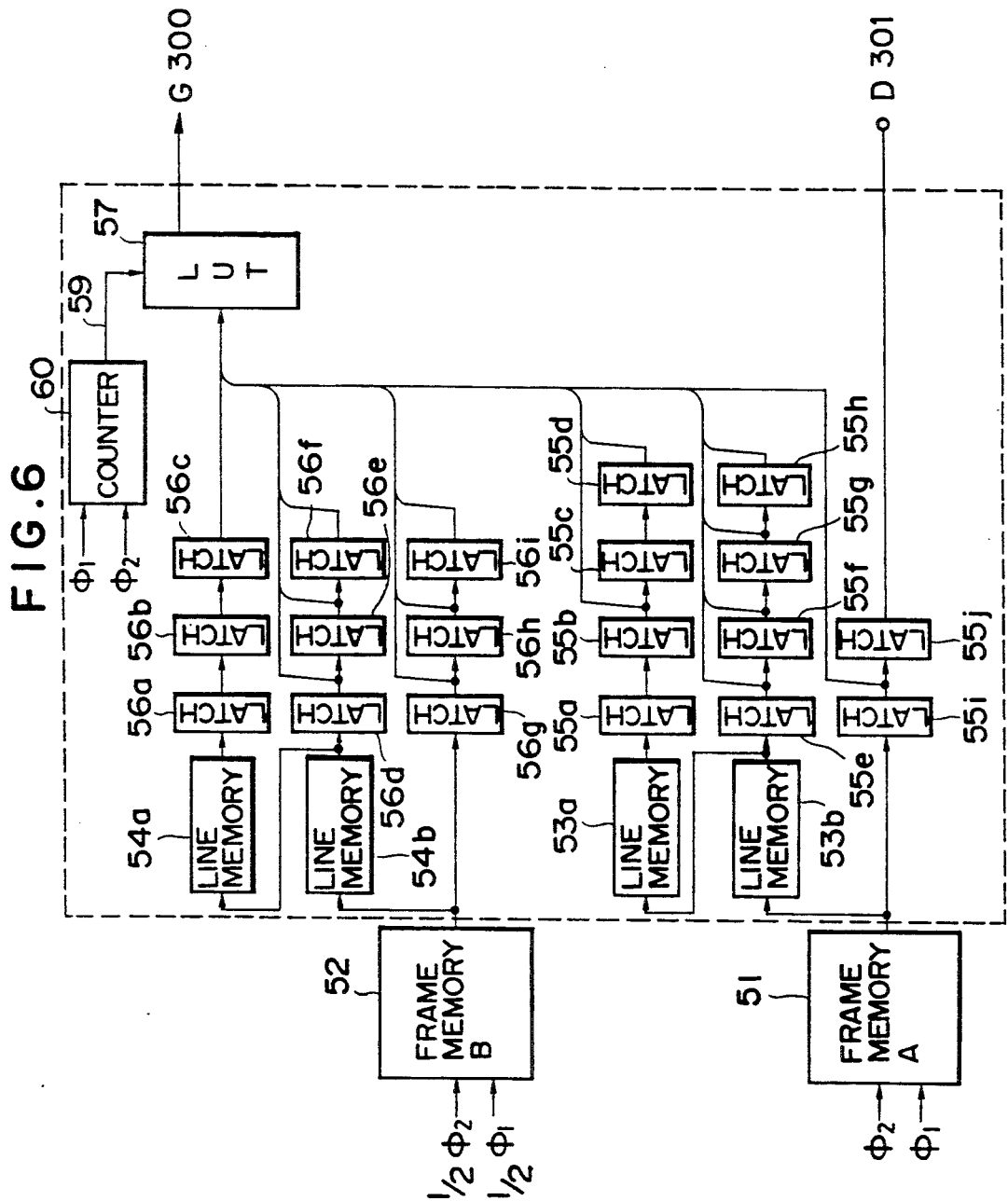

FIG.7

|   | 6 |   | 7 |
|---|---|---|---|
| 5 | 4 | 2 | 3 |
|   | 1 | * |   |

FIG.8

|   |   | 11 |
|---|---|----|
| 10 | 8 | 9 |
| 13 | 12 | 14 |

FIG.11

| PROBABILITY OF PREDICTION COMING TRUE | m | PATTERN CONFIGURATION | | | |
|---|---|---|---|---|---|
| | | A | B | C | D(OTHERS) |
| $k_1 < k \leq k_2$ | 0 | $G_1$ | $G_2$ | $G_3$ | $G_4$ |
| | 1 | $G_5$ | $G_6$ | $G_7$ | $G_8$ |
| $k_2 < k_2 < k_3$ | 0 | $G_9$ | $G_{10}$ | $G_{11}$ | $G_{12}$ |
| | 1 | $G_{13}$ | $G_{14}$ | $G_{15}$ | $G_{16}$ |
| ---------- | | --- | --- | --- | --- |
| $k_{n-1} < k \leq k_n$ | 0 | $G_{8N-7}$ | $G_{8N-6}$ | $G_{8N-5}$ | $G_{8N-4}$ |
| | 1 | $G_{8N-3}$ | $G_{8N-2}$ | $G_{8N-1}$ | $G_{8N}$ |

N GROUPS

FIG.12A  FIG.12B  FIG.12C
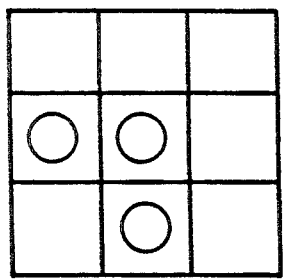 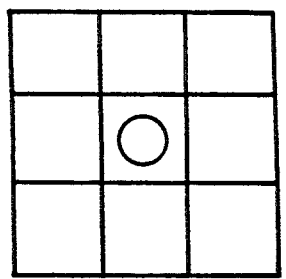 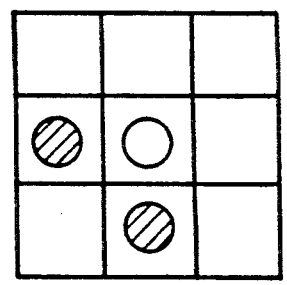
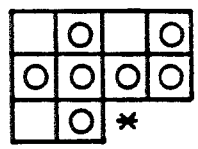 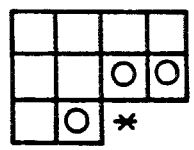 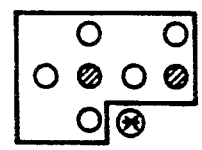

FIG. 14

| CT | Jc=0' | | 1 | | 1 | | 2 | | ... | S/2 | | S/2+1 | | ... | S-1 | | mps REVERSAL fig |
|---|---|---|---|---|---|---|---|---|---|---|---|---|---|---|---|---|---|
|  | QG | CT | QG | CT | QG | CT | QG | CT |  | QG | CT | QG | CT |  | QG | CT |  |
| 0 | 4 | 1 | 4 | 1 | 4 | 1 | 3 | 0 | --- | 1 | ○ | 1 | ○ | --- | 1 | ○ | 1 |
| 1(4) | 5 | 2 | 5 | 2 | 5 | 2 | 4 | 1 | --- | 1 | ○ | 1 | ○ | --- | 1 | ○ |  |
| 2(5) | 6 | 4 | 6 | 4 | 6 | 4 | 5 | 2 | --- | 1 | ○ | 1 | ○ | --- | 1 | ○ |  |
| 3 | 6 | 4 | 6 | 4 | 6 | 4 | 5 | 2 | --- | 1 | ○ | 1 | ○ | --- | 1 | ○ |  |
| 4(6) | 6 | 4 | 6 | 4 | 6 | 8 | 5 | 2 | --- | 1 | ○ | 1 | ○ | --- | 1 | ○ |  |
| 5 | 7 | 8 | 7 | 8 | 7 | 8 | 6 | 4 | --- | 1 | ○ | 1 | ○ | --- | 1 | ○ |  |
| 6 | 7 | 8 | 7 | 8 | 7 | 8 | 6 | 4 | --- | 1 | ○ | 1 | ○ | --- | 1 | ○ |  |
| 7 | 7 | 8 | 7 | 8 | 7 | 8 | 6 | 4 | --- | 1 | ○ | 1 | ○ | --- | 1 | ○ |  |
| 8(7) | 7 | 8 | 7 | 8 | 7 | 8 | 6 | 4 | --- | 1 | ○ | 1 | ○ | --- | 1 | ○ |  |
| --- | --- | --- | --- | --- | --- | --- | --- | --- |  | --- | --- | --- | --- |  | --- | --- |  |

THE NUMBER OF LESS PROBABLE SYMBOLS

FIG. 15

| Q \ I/S | O/S | I/S | ----- | 1/2 | >1/2 |
|---|---|---|---|---|---|
| 1 | 2 | 2 | ----- | 1 | 1* ~500 |
| 2 | 3 | 3 | ----- | 1 | 1 |
| 3 | 4 | 3 | ----- | 1 | 1 |
| ⋮ | ⋮ | ⋮ |  | ⋮ | ⋮ |

IMAGE ENCODING METHOD

This application is a continuation of application Ser. No. 07/400,103 filed Aug. 29, 1989, now abandoned.

BACKGROUND OF THE INVENTION

1. Field of the Invention

The present invention relates to a method of encoding an image.

2. Description of the Related Art

A facsimile apparatus as a typical still image communication apparatus employs a method of encoding and transmitting an image based on MH or MR coding by sequentially scanning the image.

In this method, in order to recognize the entire image, all the image data must be transmitted, resulting in a long transmission time. It is difficult to apply this method to an image communication service, such as an image data base service, a videotex, or the like, in which an image must be quickly judged.

As an encoding method applicable to such a service, for example, a method, e.g., arithmetic coding, in which a pixel of interest is predicted on the basis of a plurality of surrounding pixels near the pixel of interest, and an image is encoded on the basis of coincidence/noncoincidence between the predicted pixel and an actual pixel of interest, is proposed.

With this method, encoding with higher efficiency can be achieved by a simpler arrangement than those for conventional MH or MR coding.

In such coding, however, parameters necessary for predicting a pixel of interest based on surrounding pixels are predetermined using a standard image. Therefore, for an image having a feature different from that of a standard image, the probability of prediction coming true is low, and coding efficiency is impaired. In some cases, encoded data may become longer than original data.

SUMMARY OF THE INVENTION

The present invention has been made in consideration of the above situation, and has as its object to provide an image encoding method, with which efficient encoding can be executed for various images.

It is another object of the present invention to provide an image encoding method, with which encoding can be adaptively performed for an image to be encoded.

It is still another object of the present invention to provide an image encoding method, with which efficient encoding is executed according to a pattern of an image to be encoded.

The above and other objects and features of the present invention will be apparent from the following description.

BRIEF DESCRIPTION OF THE DRAWINGS

FIG. 3 is a table showing coefficients of a low-pass filter;

FIG. 4 is a block diagram of an embodiment of a low-pass filter;

FIG. 5 is a view for explaining a sub-sampling operation;

FIG. 6 is a block diagram of a prediction circuit;

FIG. 7 is a view for explaining reference pixels on a coding surface;

FIG. 8 is a view for explaining reference pixels of an image sent one stage before the current stage;

FIG. 11 shows a table for grouping;

FIGS. 12A to 12C show examples of a characteristic pattern;

FIG. 14 shows a table for determining parameters;

FIG. 15 shows a table used in a second embodiment; and

DETAILED DESCRIPTION OF THE PREFERRED EMBODIMENTS

Figure 1:
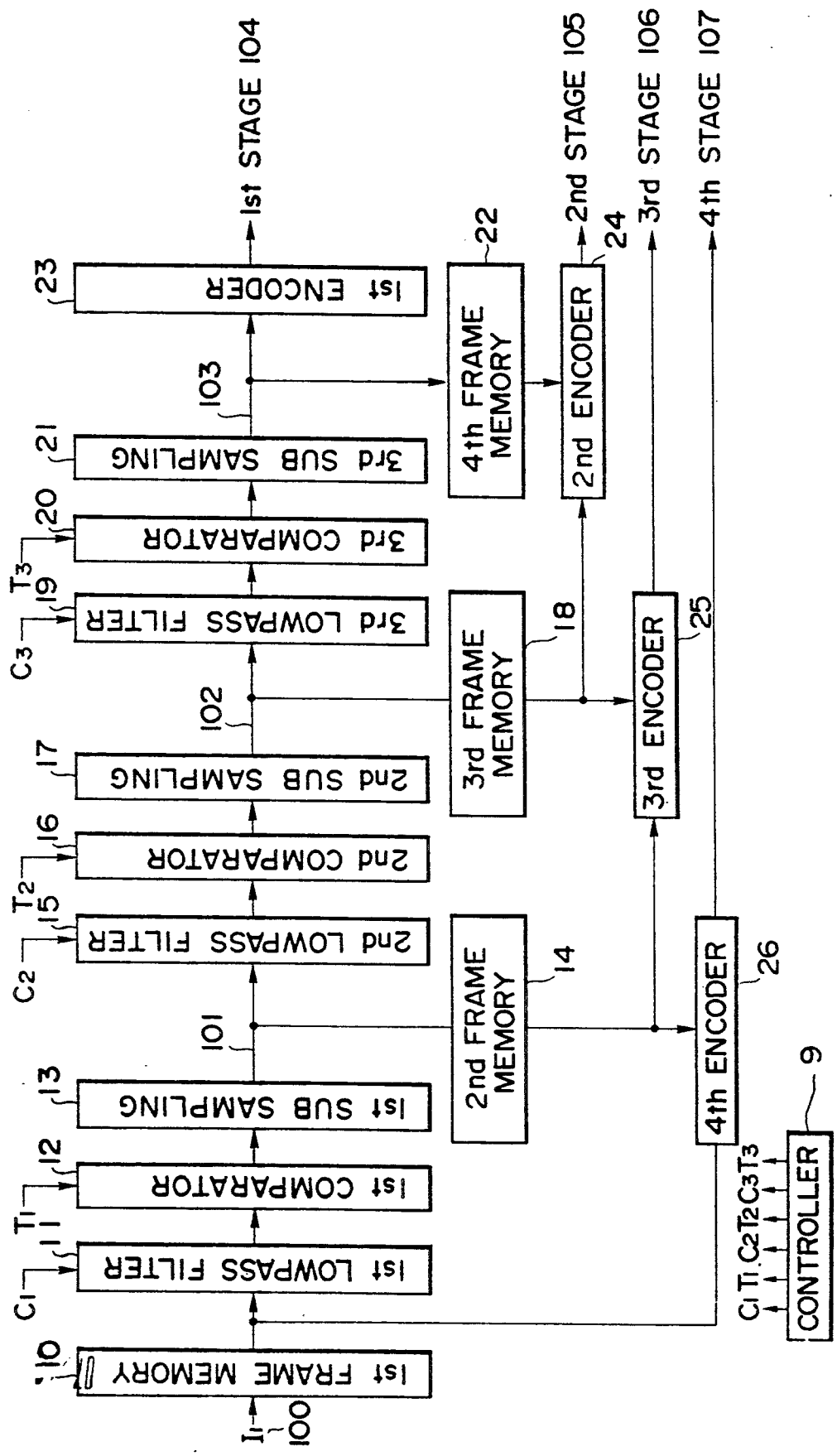
FIG. 1 is a block diagram of an embodiment of an encoder.

FIG. 1 shows an embodiment of an encoder to which the present invention is applied.

Original image data $I_1$ as binary data representing black/white of each pixel of an original image is stored in a first frame memory 10. A first low-pass filter 11 then performs smoothing processing of the image data. The smoothed data is binary-encoded again by a first comparator 12. A parameter $C_1$ for adjusting a degree of smoothing is input to the first low-pass filter 11. A threshold value $T_1$ is input to the first comparator 12. These values are determined by a controller 9 on the basis of required image quality and encoding efficiency. A first sub sampling 13 generates a signal 101 representing an image which is sampled to ½ in both the vertical and horizontal directions. The signal 101 is stored in a second frame memory 14.

The signal 101 is similarly processed by a second low-pass filter 15, a second comparator 16, and a second sub sampling 17, thus generating a signal 102 representing a ¼ image. The signal 102 is stored in a third frame memory 18. The signal 102 is similarly processed by a third low-pass filter 19, a third comparator 20, and a third sub sampling 21 to obtain a signal 103 representing an ⅛ image. The signal 103 is stored in a fourth frame memory 22. The controller 9 inputs parameters $C_2$ and $C_3$ to the second and third low-pass filters, and threshold values $T_2$ and $T_3$ to the second and third comparators, respectively.

The signal 103 is encoded by a first encoder 23, and is transmitted as a first-stage signal 104.

A second encoder 24 performs encoding with reference to data in the fourth and third frame memories 22 and 18, and transmits a second-stage signal 105. Similarly, a third encoder 25 performs encoding with reference to data in the third and second frame memories 18 and 14, and transmits a third-stage signal 106. Similarly, a fourth encoder 26 performs encoding with reference to the second and first frame memories 14 and 10, and transmits a fourth-stage signal 107. As described above, the first to fourth encoders encode image data having different resolutions.

The image data of the first to fourth stages are encoded and transmitted in the order starting from one having a low resolution, so that a reception side can immediately identify the entire image before image data having higher resolutions are transmitted. If the data is unnecessary, transmission of image data of the higher resolutions can be stopped. Thus, a communication time of unnecessary data can be reduced, and an efficient image communication service can be provided.

Figure 2:
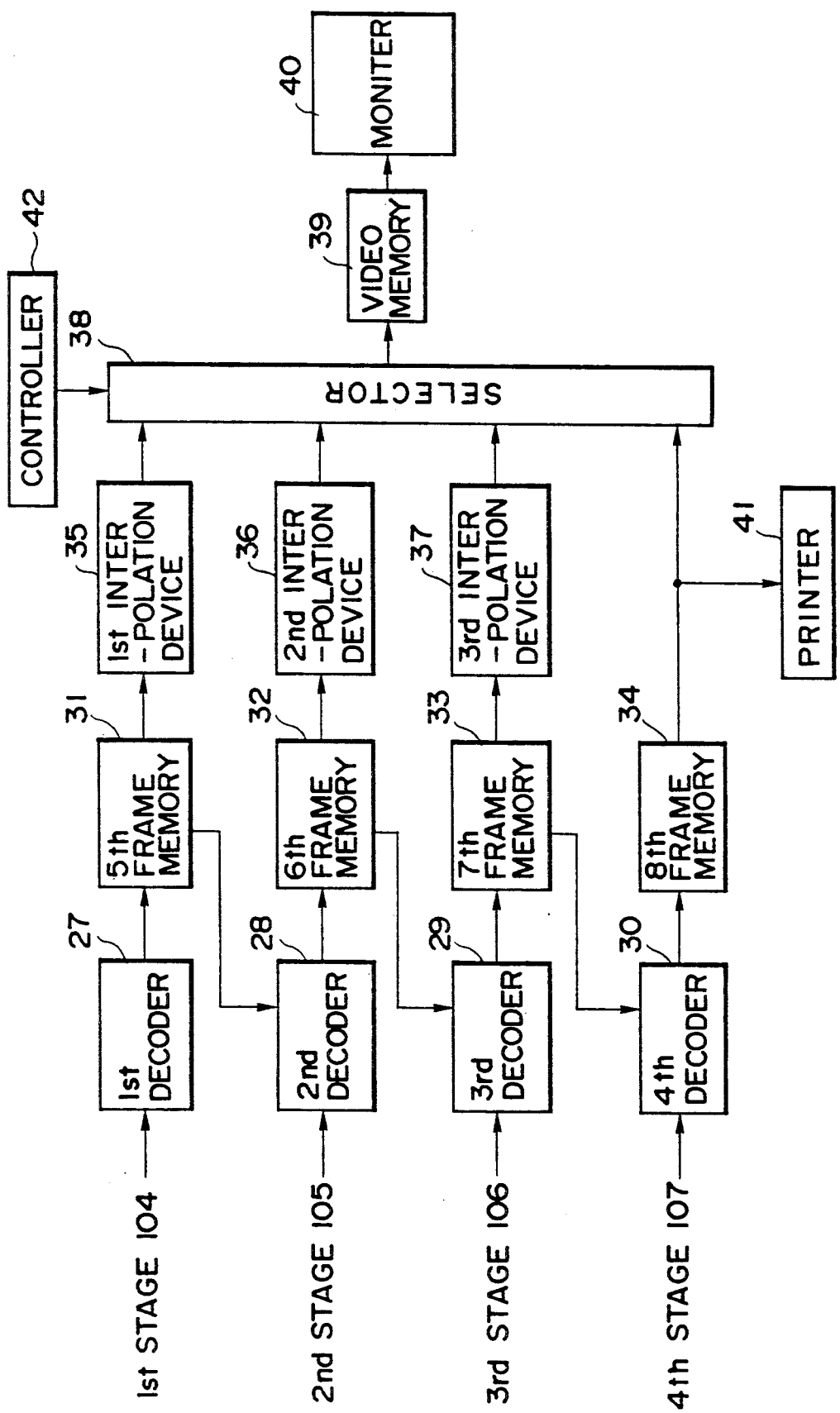
FIG. 2 is a block diagram of an embodiment of a decoder.

FIG. 2 shows an embodiment of a decoder for decoding image data encoded by the encoder shown in FIG. 1.

The first-stage signal 104 encoded based on an 1/8 image by the encoder is decoded by a first decoder 27, and the decoded signal is stored in a fifth frame memory 31. This signal is converted to high-resolution data by ×8 interpolation processing of a first interpolation device 35, and the high-resolution data is then stored in a video memory 39 through a selector 38 which is switched by a controller 42. The video memory 39 comprises a 2-port memory which can perform parallel input/output operations. Therefore, an image decoded at the reception side is displayed on a monitor 40 as needed.

The second-stage signal 105 encoded based on 1/4 and 1/8 images by the encoder is decoded by a second decoder 28 with reference to data stored in the fifth frame memory 31, and is stored in a sixth frame memory 32. This data is subjected to ×4 interpolation processing by a second interpolation device 36, and is stored in the video memory 39 upon switching of the selector 38.

Similarly, the third-stage signal 106 encoded based on 1/2 and 1/4 images by the encoder and the fourth-stage signal 107 encoded based on an original image and a 1/2 image are respectively decoded by third and fourth decoders 29 and 30, seventh and eighth frame memories 33 and 34, and a third interpolation device 37, and are stored in the video memory 39. The stored data are displayed on the monitor 40.

The signal stored in the eighth frame memory 34 as a fourth-stage decoded image signal is output to a printer 41 to obtain a hard copy.

FIG. 3 shows filter coefficients of a 3×3 (pixel) low-pass filter used as the first, second, and third low-pass filters in the encoder shown in FIG. 1. The weighting coefficient of the central pixel is represented by C, a weighting coefficient of 2 is assigned to four pixels nearest to the central pixel, and a weighting coefficient of 1 is assigned to the next nearest pixels.

Thus, the value of the central pixel is represented by $D_{ij}$ (i=1 to M and j=1 to N: M and N are pixel sizes in the horizontal and vertical directions), an average density W is given by:

$$W = (D_{i-1,j-1} + 2D_{ij-1} + D_{i+1,j-1} + 2D_{i-1,j} + cD_{ij} + 2D_{i+1,j} + D_{i-1,j+1} + 2D_{ij+1} + D_{i+1,j+1})$$

Each of the first, second, and third comparators binary-encodes this value W with a threshold value T (standard setup value is T=(12+C)/2). The values W and T have the following correspondence.

If W≧T, output signal=1
If W<T, output signal=0

FIG. 4 is a block diagram of the low-pass filter and the comparator for performing the above-mentioned arithmetic operations. An input signal is latched by latches 44a, 44b, and 44c to be delayed by one pixel clock, respectively. Line memories 43-a and 43-b hold input signals delayed by one line. Signals having pixel positions corresponding to those of the latches 44a, 44b, and 44c are obtained at latches 44d, 44e, and 44f, and latches 44g, 44h, and 44i. Thus, data corresponding to nine pixels shown in FIG. 3 are obtained. The output signals from the latches 44a, 44c, 44g, and 44i are added by an adder 45a, and the sum data is multiplied with a constant (×1) by a multiplier 46a.

The output signals from the latches 44b, 44d, 44f, and 44h are added by an adder 45b, and the sum data is multiplied with a constant (×2) by a multiplier 46b. The output signal from the latch 44e as the central value is multiplied with a constant (×C) by a multiplier 46c. The value C can be set by the external controller 9, and its standard value is C=4.

The output signals from the multipliers 46a, 46b, and 46c are added by an adder 47, and the sum data is compared with the threshold value T by a comparator 48. When the sum data is larger than the threshold value T, a signal of "1" level is obtained; otherwise, a signal of "0" level is obtained The threshold value T can also be set by the external controller 9, and has a value of T=(12+C)/2 as the standard value, as described above.

FIG. 5 is a view for explaining a sub-sampling operation in the encoder shown in FIG. 1. Hatched pixel data in FIG. 5 are sampled at every other timings in main and sub scan directions, thus forming a sub-sampled image having a 1/2 size (1/4 in terms of an area). Such a sub-sampling operation can be easily realized by adjusting latch timing of image data.

Encoding by the encoders 23 to 26 shown in FIG. 1 will be described below. In this embodiment, encoding is performed using arithmetic coding, and a value of a pixel of interest is predicted on the basis of surrounding pixels. A symbol when a prediction is successful is called a most probable symbol (1), a symbol when prediction is unsuccessful is called a less probable symbol (0), and a generation probability of the less probable symbol is represented by p. With this data, encoding is performed. For further details about arithmetic coding, please refer to "Image Signal Processing for FAX and OA", Takahiko FUKINUKI, Nikkan Kogyo, Co.

More specifically, if a binary arithmetic code for a code string s is represented by C(S) and its assist amount is represented by A(S), encoding progresses according to the following arithmetic operations:

$$\begin{aligned} A(S1) &= A(S) \cdot P(S) = A(S) \cdot 2^{-Q(S)} \\ A(S0) &= A(S) - A(S1) \\ C(S1) &= C(S) + A(S0) \\ (S0) &= C(S) \end{aligned} \quad (1)$$

for A (null) = 0.11 ... 1

Assuming $p(S) = 2^{-Q(S)}$, multiplication is performed by only shifting a binary number. Q is called a skew value, and when this parameter is changed, arithmetic coding can be dynamically used.

In decoding, a binary signal string S is given by S'×S", and when decoding progresses up to S', C(S) and C(S')+A(S'0) are compared. When C(S)>C(S')+A(S'0), decoding is performed if x=1; otherwise, decoding is performed if X=0.

In this embodiment, the skew value Q, a most probable symbol m (or a less probable or inferiority symbol l) are dynamically determined on the basis of previously encoded data, thus realizing dynamic encoding. In contrast to this method, static coding in which Q and m values are predetermined on the basis of a standard image is known. These methods have different characteristics.

The arrangement for achieving this encoding will be described below.

FIG. 6 is a block diagram of a circuit portion for predicting a pixel of interest in the second, third, and fourth encoders 24, 25, and 26.

A frame memory A51 is a memory for storing at least one frame of image data to be encoded. A frame memory B52 stores at least one frame of image data which corresponds to an image sent one stage before and is sub-sampled to $\frac{1}{2}$ of the image data stored in the frame memory A51. Each frame memory comprises a two-dimensional memory. If a clock for x addresses is represented by $\phi_1$ and a clock for y addresses is represented by $\phi_2$, the clocks $\phi_1$ and $\phi_2$ are input to the frame memory A51, and clocks $\frac{1}{2}\phi_1$ and $\frac{1}{2}\phi_2$ having a $\frac{1}{2}$ frequency are input to the frame memory B52. Thus, one pixel of the frame memory B52 corresponds to $2 \times 2$, i.e., 4 pixels of the frame memory A51.

Figures 7, 8:
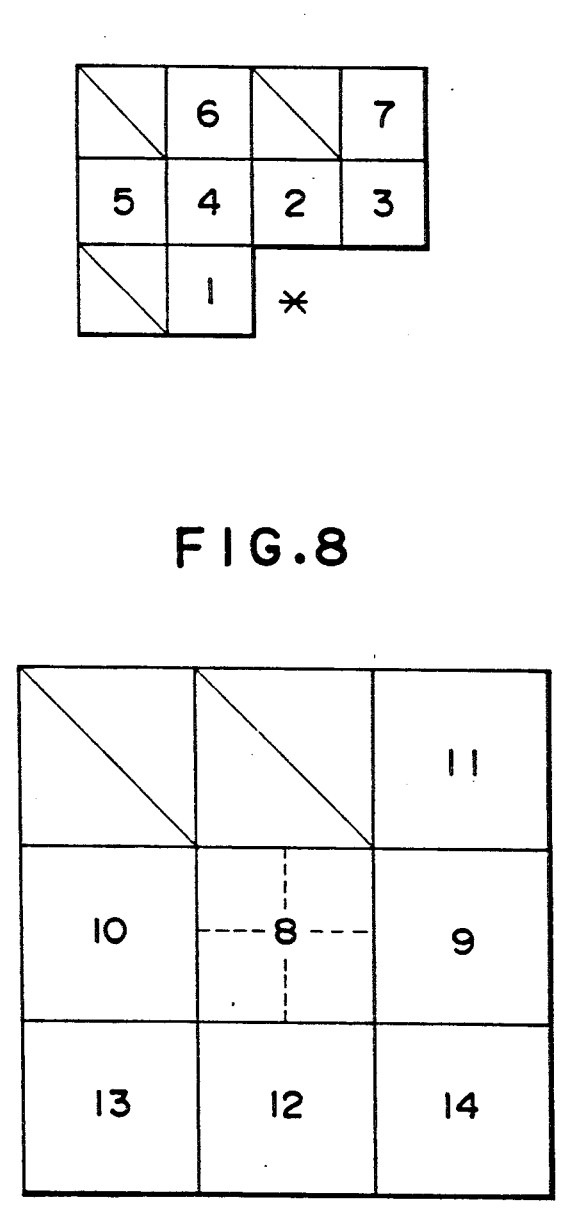

Data read out from the frame memories A51 and B52 are delayed by one line in line memories 53a, 53b, 54a, and 54b, and are input to latches 55 and 56. These latches hold data delayed by one pixel. FIG. 7 shows the positions of reference pixels of image data read out from the frame memory A51. The outputs from the latches shown in FIG. 6 have the following correspondence with the pixel positions shown in FIG. 7. That is, a pixel of interest (*) corresponds to the output from a latch 55j (pixel of interest signal D301); a position No. 1 in FIG. 7, the output from a latch 55i; No. 2, a latch 55g; No. 3, a latch 55h; No. 4, a latch 55f; No. 5, a latch 55e; No. 6, a latch 55b; and No. 7, a latch 55d.

FIG. 8 shows the positions of reference pixels of image data read out from the frame memory B52. A pixel position No. 8 corresponds to the output from a latch 56e; No. 9, a latch 56c; No. 10, a latch 56d; No. 11, a latch 56c; No. 12, a latch 56h; No. 13, a latch 56g; and No 14, a latch 56i.

An image at the position No. 8 in FIG. 8 is $\frac{1}{2}$ image data corresponding to $2 \times 2$ pixels including a pixel of interest. A 2-bit pixel position signal 59 for identifying the position of the pixel of interest in No. 8 (four states, i.e., upper left, upper right, lower left, and lower right) is generated by a counter 60 on the basis of the clocks $\phi_1$ and $\phi_2$.

The pixel position signal 59 and pixel signals from the latches 55 and 56 are input to an LUT (look-up table) 57. The LUT 57 outputs a group signal G300 indicating a group number of each state (pattern).

This grouping is performed on the basis of the following three methods:

(1) Classify patterns having close probabilities of a prediction coming true.

(2) Classify patterns having similar pattern configurations.

(3) Classify characteristic image patterns.

A probability of a prediction coming true k for each state (pattern) is obtained from a standard pattern according to the method (1), and the states are divided into N groups according to the k values. These groups are further divided to $N \times 2$ groups under a condition that a group having a white prediction pixel (mps) is represented by 0, and a group having a black prediction pixel is represented by 1.

According to the method (2), of prediction patterns, patterns in which pixels indicated by marks "○" as shown in FIG. 12A have the same values are extracted (other pixel states are not considered) as a group A. Patterns in which pixels shown in FIG. 12B have the same values and which do not belong to the group A are extracted as a group B. According to the method (3), patterns which tend to characteristically appear in a dither image, as shown in FIG. 12C (pixels indicated by marks "○" have the same values, and pixels indicated by marks " " have opposite values) and which belong to neither the group A nor the group B are extracted as a group C. Patterns other than the groups A, B, and C are extracted as a group D. FIG. 11 shows results of such grouping. $G_1, G_2, \ldots, G_{8N}$ indicate group numbers of patterns. $k_i$ (i=1 to n) indicates a probability at a division point. The number of groups and similar pattern configurations are course.

Thus, a grouping is made on the basis of not only a probability of prediction coming true but also the similarity of patterns and the separation of characteristic patterns, so that an image other than a standard image can be adaptively encoded.

The prediction circuit in the first encoder 23 shown in FIG. 1 has substantially the same arrangement as that in FIG. 6, except that the line memories 54a and 54b, the latches 56a to 56i, and the counter 60 for processing the output from the frame memory B52 are omitted.

Figure 13:
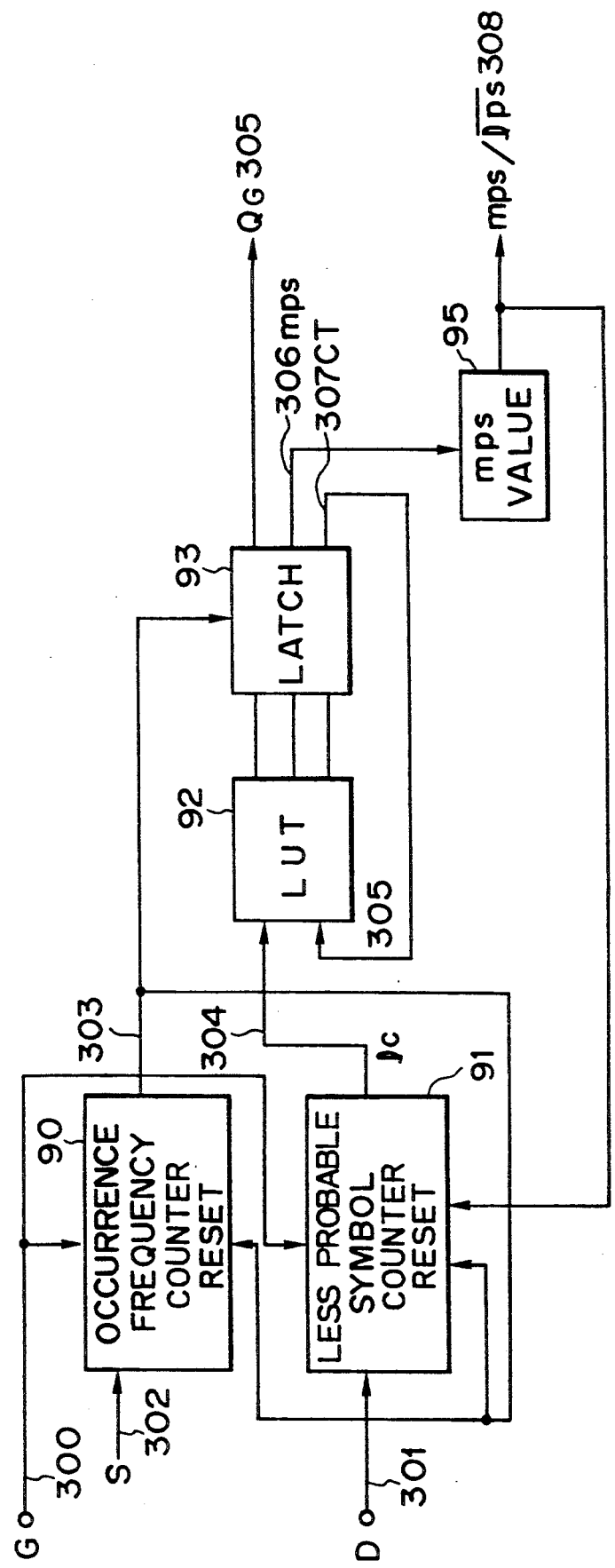
FIG. 13 is a block diagram of a circuit for determining encoding parameters Q and l.

FIG. 13 is a block diagram of a probability estimation circuit for dynamically changing the skew value Q and the inferiority symbol lps. The group signal G300 and the pixel of interest signal D301 output from the prediction circuit shown in FIG. 6 are respectively input to an occurrence frequency counter 90 and an inferiority symbol counter 91 for each group. In these counters, internal counters corresponding in number to the groups are prepared so that they perform counting operations in units of groups, and are switched in response to the group signal G.

The occurrence frequency counter reset 90 counts the frequency of occurrence of a state of a given group for each group, and outputs an updating signal 303 when the count value of each group exceeds a setup value S 302. The counter 91 counts the number of inferiority symbols generated from when the updating signal is generated until the next updating signal is generated in units of groups, and outputs a count value lc 304. More specifically, the fact that S states of a given group include lc inferiority symbols is revealed on the basis of the output from the counter 91. In the following description, a state of S=16 will be exemplified.

An LUT 92 prestores $Q_G$ 305 as the next encoding parameter for occurrence of lc inferiority symbols, a reversal signal 306 indicating reversal of an mps (most probable symbol) value so far, and data called zero count (CT) 307.

The zero count is a value representing the number of previous states of "0" in each of which no inferiority symbol lc is generated in S states, and represents the number of continuous most probable symbols. More specifically, in principle, when CT=0 is initially set, every time a state in which lc is 0 in S states occurs, CT is updated to 1. Thereafter, if the state of 0 continues twice and three times, CT is updated to 2 and 3.

FIG. 14 shows a content of the LUT 92.

In an initial state, CT=0 is set, and a new $Q_G$ and the next CT value are obtained on the basis of the lc value. For example, when CT=0 and lc=0, CT =1. When the updating signal 303 arrives for the next time and when CT=1 and lc=1, $Q_G$=5 and CT=2.

When CT=0 and lc=1, $Q_G$=4 and CT=1.

Equations for creating this table are:

$$Q_G \approx -\log_2 \frac{lc}{S \times (CT + 1)} \quad (2)$$

$$CT \approx \frac{2^{Q_G}}{S} \quad (3)$$

In equation (2), $Q_G$ is an exponential portion when a probability of generation of inferiority symbols generated when S states continuously appear (CT+1) times is approximated by a power of 2.

In equation (3), CT recalculates the number of sets of S "lc=0"s assuming that the probability of generation of inferiority symbols is given by $\frac{1}{2}Q^G$. Since $2^{Q_G}$ represents the number of most probable symbols, CT is obtained by dividing $2^{Q_G}$ with S.

A case of CT=0 and lc>(S/2)+1 is processed as a special case, and an mps reversal signal is output to reverse a value which has been originally used as an inferiority symbol (i.e., $0 \rightleftharpoons 1$). If the following state is other than CT=0 and lc>(S/2)+1, encoding processing is normally performed without changing the inferiority symbol.

In FIG. 13, a latch 93 holds original $Q_G$ 305, the mps reversal signal 306, and CT 307. In response to the updating signal 303 from the occurrence frequency counter 90, the latch 93 latches the output from the LUT 92, and is updated to a new state.

The count signal (c of the inferiority symbols and the CT value 307 indicating the number of previous most probable symbols are input to the LUT 92. The LUT 92 outputs $Q_G$ and CT which are updated in accordance with the table shown in FIG. 14, and the mps reversal signal if necessary. An mps memory 95 holds the most probable symbol (0 or 1) which has been used up to the latest encoding, and this state is reversed by the mps reversal signal. An mps/$\overline{lps}$ signal as an output of the memory 95 is supplied to the inferiority symbol counter 91. The inferiority symbol counter counts pixel data D corresponding to inferiority symbols represented by the mps/$\overline{lps}$ signal as the inferiority symbols.

Encoding is performed based on $Q_G$ and mps/$\overline{lps}$ determined herein.

Figure 9:
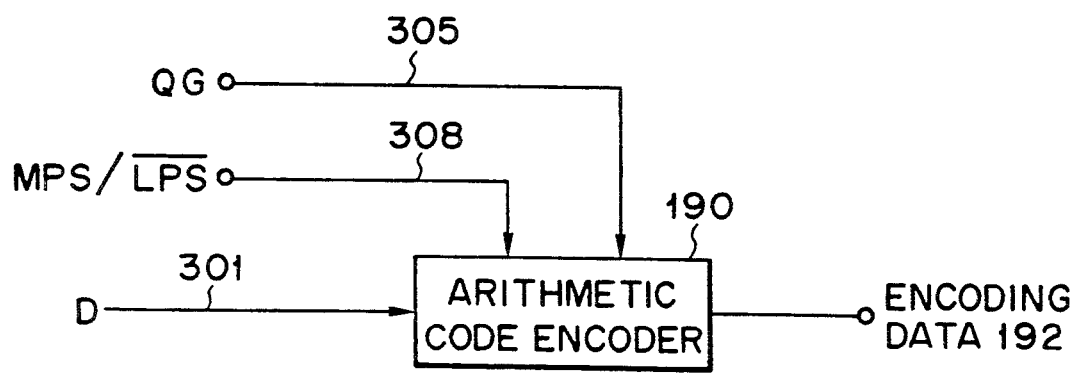
FIG. 9 is a block diagram of an arithmetic code encoder.

FIG. 9 is a block diagram of an arithmetic coding encoder. If $Q_G$ 305 from the latch 93 shown in FIG. 13 represents a skew value, $Q_G$ 305 and MPS/$\overline{LPS}$ 308 are input to the encoder, and arithmetic operations given by equations (1) are performed for a pixel of interest data D 301 by an encoder 190, thus obtaining encoding data 192.

In this manner, the skew value Q and the most probable symbol as encoding parameters are dynamically determined on the basis of the previously encoded data, and encoding is performed on the basis of these parameters. As a result, efficient encoding of various images having different features from that of a standard image can be achieved.

Figure 10:
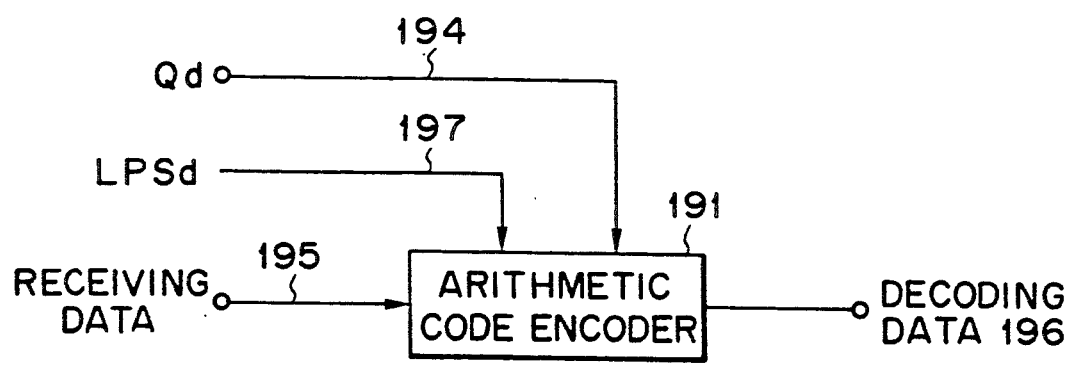
FIG. 10 is a block diagram of an arithmetic code decoder.

FIG. 10 is a block diagram of the first, second, third, and fourth decoders 27, 28, 29, and 30. In the decoder, a prediction circuit and a probability estimation circuit shown in FIGS. 6 and 13 are prepared as in the encoder. A decoder 191 performs decoding on the basis of a skew value $Q_G d$ 94 of the decoder, an inferiority symbol LPSd 197 from the LUT, and receiving data 195, thus obtaining decoding data 196.

Figure 15:
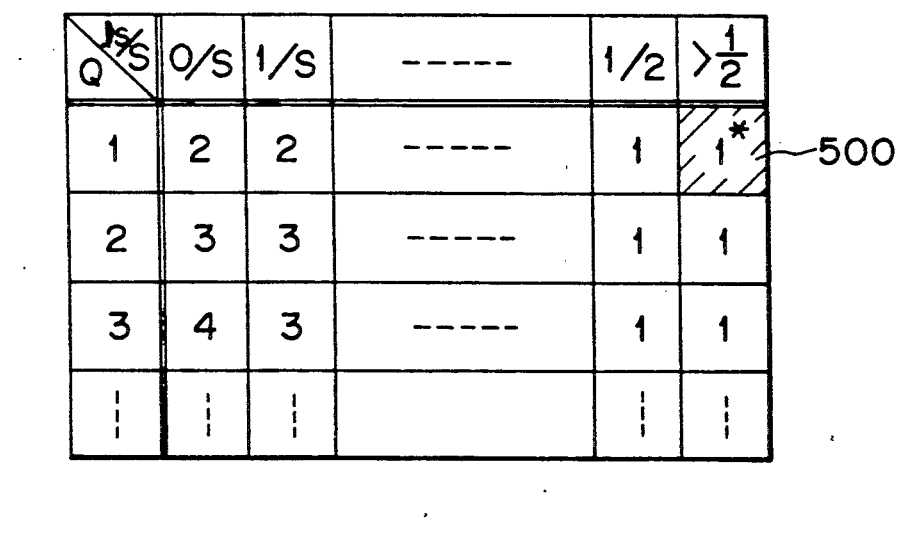

As another method of determining the content of the LUT 92 shown in FIG. 13, lc/S is calculated on the basis of the number of inferiority symbols lc in S pixels to determine new $Q_G$ in accordance with the relationship shown in FIG. 15. An initial value is set to be $Q_G=1$, and $Q_G$ is updated on the basis of the value of lc/S. In the second and subsequent encoding operations, $Q_G$ is determined on the basis of updated $Q_G$ and lc/S. An updated value $Q_G'$ is calculated by:

$$\frac{1}{2^{Q_G'}} \approx \frac{\frac{1}{2^{Q_G}} + \frac{lc}{S}}{2} \quad (4)$$

The calculated value is stored in a table. When Q=1 and lc/S>$\frac{1}{2}$, a signal 500 reverses the most probable/inferiority symbol.

Figure 16:
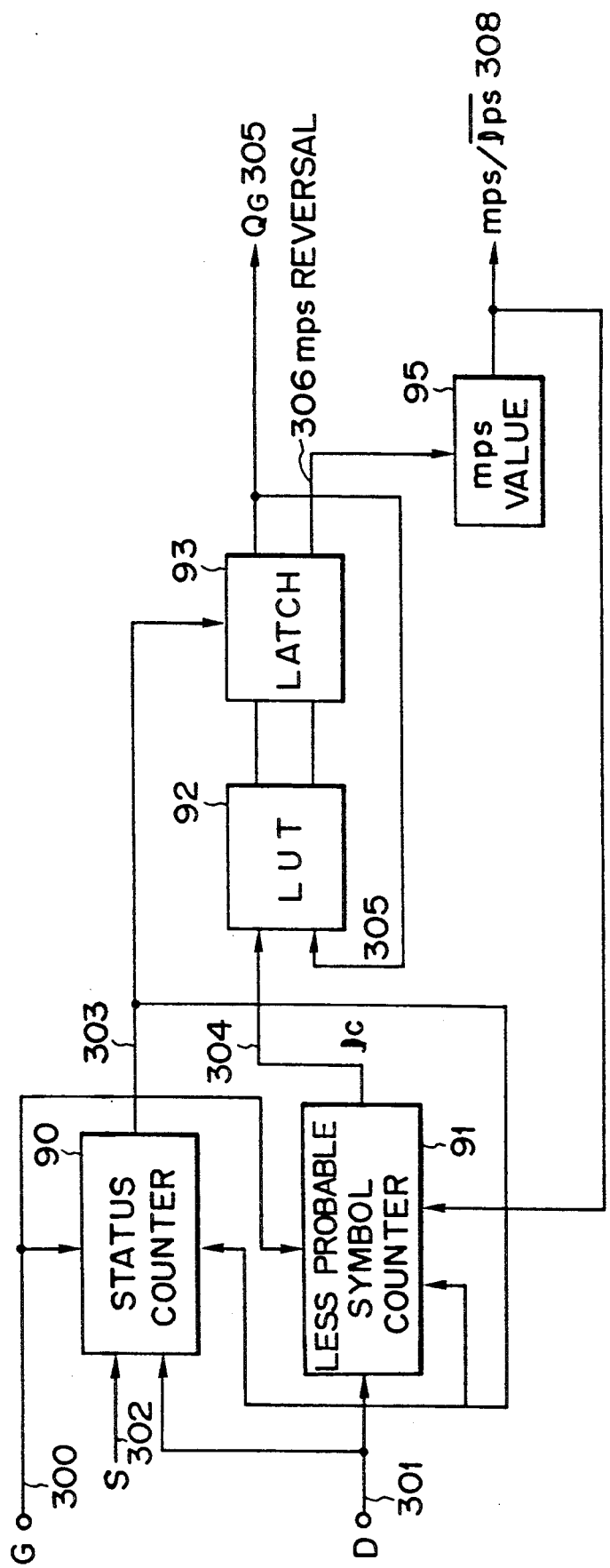
FIG. 16 is a block diagram showing the second embodiment.

FIG. 16 shows an embodiment of a probability estimation circuit when this LUT is used. A $Q_G$ signal 305 is input to an LUT 92 to determine $Q_G$ to be updated.

In this embodiment, dynamic arithmetic coding has been exemplified as an encoding method. However, the present invention may be applied to other methods using dynamic parameters.

As described above, parameters for predicting a pixel of interest on the basis of a plurality of pixels near the pixel of interest are dynamically changed in accordance with a rate of coincidence/noncoincidence between the predicted pixel and the pixel of interest, so that efficient encoding can be achieved for various images.

An information source which is divided into a large number of patterns by reference pixels is subjected to grouping on the basis of a probability of prediction coming true and similarity, thus allowing dynamic encoding with good coding efficiency.

The preferred embodiment of the present invention has been described. However, the present invention is not limited to this, and various changes and modifications may be made within the spirit and scope of the appended claims.

What is claimed is:

1. An image encoding method comprising the steps of:
   classifying a plurality of patterns, all of which may be provided by a plurality of pixels near a pixel of interest, into a plurality of groups based on a probability of prediction coming true and a pattern configuration;
   providing a plurality of prediction parameters each corresponding to the associated one of the plurality of groups;
   predicting the pixel of interest with reference to the plurality of pixels near the pixel interest by using a prediction parameter corresponding to a group classified in the plurality of pixels; and
   encoding an image on the basis of a coincidence/non-coincidence between the predicted pixel and the pixel of interest.

2. A method according to claim 1, wherein an image is encoded by arithmetic coding.

3. A method according to claim 1, wherein the prediction parameter for predicting a pixel is varied in units of the classified groups.

4. A method according to claim 1, wherein the prediction parameter is a probability of occurrence of the predicted pixel.

5. A method according to claim 1, wherein the prediction parameter is a value of a pixel which has a high probability of occurrence.

6. A method according to claim 1, wherein a plurality of patterns, which are close in the probability of a true prediction, are classified into a single group.

7. An image encoding method comprising the steps of:
classifying a plurality of patterns, all of which may be provided by a plurality of pixels near a pixel of interest, into a plurality of groups;
providing a plurality of prediction parameters each corresponding to an associated one of the plurality of groups;
predicting the pixel of interest with reference to the plurality of pixels near the pixel interest by using a prediction parameter corresponding to a group classified in the plurality of pixels;
encoding an image on the basis of a coincidence/noncoincidence between the predicted pixel and the pixel of interest; and
individually changing the plurality of prediction parameters, each corresponding to the associated one of the plurality of groups in accordance with the rate of a coincidence/noncoincidence between the predicted pixel and the pixel of interest involved in the respective patterns.

8. A method according to claim 7, wherein an image is encoded by arithmetic coding.

9. A method according to claim 7, wherein the prediction parameter is a probability of occurrence of the predicted pixel.

10. A method according to claim 7, wherein the prediction parameter is a value of a pixel which has a high probability of occurrence.

11. An image encoding method comprising the steps of:
providing a prediction parameter for predicting a pixel of interest referring to a plurality of pixels near the pixel of interest by using a table;
predicting the pixel of interest with reference to the plurality of pixels near the pixel interest by using the prediction parameter;
encoding an image on the basis of a coincidence/noncoincidence between the predicted pixel and the pixel of interest; and
changing the table for providing the prediction parameter in accordance with the number of times of the noncoincidence between the predicted pixel and the pixel of interest.

12. A method according to claim 11, wherein an image is encoded by arithmetic coding.

13. A method according to claim 11, wherein the prediction parameter for predicting a pixel is varied in units of classified groups.

14. A method according to claim 11, wherein the prediction parameter is a probability of occurrence of the predicted pixel.

15. A method according to claim 11, wherein a plurality of tables are provided which are mutually different from each other in varying a rate of the prediction parameter.

16. An image encoding method comprising the steps of:
setting a plurality of tables which are mutually different from each other in varying a rate of a prediction parameter;
providing a prediction parameter for predicting a pixel of interest referring to a plurality of pixels near the pixel of interest by using one of the tables;
predicting the pixel of interest with reference to the plurality of pixels near the pixel of interest by using the prediction parameter;
encoding an image on the basis of coincidence/noncoincidence between the predicted pixel and the pixel of interest; and
determining the table for providing the prediction parameter for use in encoding a succeeding pixel of interest, in accordance with the coincidence/noncoincidence between the predicted pixel and the pixel of interest.

17. A method according to claim 16, wherein the image is one which has been encoded by arithmetic coding.

18. A method according to claim 16, wherein the prediction parameter for predicting a pixel is varied in units of classified groups.

19. A method according to claim 16, wherein the prediction parameter is a probability of occurrence of the predicted pixel.

* * * * *

UNITED STATES PATENT AND TRADEMARK OFFICE
CERTIFICATE OF CORRECTION

PATENT NO. : 5,136,396
DATED : August 4, 1992
INVENTOR(S) : SHIGEO KATO ET AL.

It is certified that error appears in the above-identified patent and that said Letters Patent is hereby corrected as shown below:

SHEET 1 OF 12

FIG. 1, "SUB SAMPLING" (both occurrences) should read --SUB-SAMPLING--.

COLUMN 2

Line 35, "sub sampling" should read --sub-sampling--.
    Line 41, "sub sampling" should read --sub-sampling--.
    Line 45, "sub sampling" should read --sub-sampling--.

COLUMN 4

Line 15, "obtained" should read --obtained.--.
    Line 22, "sub scan" should read --sub-scan--.

COLUMN 6

Line 6, "marks "  "" shouldread --marks "."--.
    Line 13, "are course." should read
        --are not limited to those in this embodiment, as a matter of course.--.

COLUMN 7

Line 28, "signal (c" should read --signal 1c--.

COLUMN 8

Line 51, "pixel" should read --pixel of--.

UNITED STATES PATENT AND TRADEMARK OFFICE
CERTIFICATE OF CORRECTION

PATENT NO. : 5,136,396
DATED : August 4, 1992
INVENTOR(S) : SHIGEO KATO ET AL.  Page 2 of 2

It is certified that error appears in the above-identified patent and that said Letters Patent is hereby corrected as shown below:

COLUMN 9

Line 13, "pixel" should read --pixel of--.
Line 41, "pixel" should read --pixel of--.

Signed and Sealed this

Fifth Day of October, 1993

Attest:

BRUCE LEHMAN

Attesting Officer  Commissioner of Patents and Trademarks